[12] United States Patent
Eveleens et al.

(10) Patent No.: US 7,324,159 B2
(45) Date of Patent: Jan. 29, 2008

(54) METHOD AND DEVICE COMMUNICATING A COMMAND

(75) Inventors: Jan Eveleens, Eindhoven (NL); Gerardus Cornelis Petrus Lokhoff, Eindhoven (NL); Arnoldus Johannes Lucas Maria Maandonks, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 786 days.

(21) Appl. No.: 09/992,928

(22) Filed: Nov. 5, 2001

(65) Prior Publication Data

US 2002/0080271 A1    Jun. 27, 2002

(30) Foreign Application Priority Data

Nov. 8, 2000    (EP) .................. 00203912

(51) Int. Cl.
*H04N 7/00* (2006.01)

(52) U.S. Cl. .................................... 348/460

(58) Field of Classification Search ................ 348/460, 348/461, 473; 713/171, 176; 382/100, 192–9; 380/277–278
See application file for complete search history.

(56) References Cited

U.S. PATENT DOCUMENTS

| 4,237,449 | A | * | 12/1980 | Zibell ....................... 340/407.1 |
| 4,807,031 | A | * | 2/1989 | Broughton et al. ......... 348/460 |
| 5,748,783 | A | * | 5/1998 | Rhoads ........................ 382/232 |
| 5,809,139 | A | * | 9/1998 | Girod et al. ................. 380/202 |
| 5,841,978 | A | * | 11/1998 | Rhoads ........................ 709/217 |
| 5,930,369 | A | * | 7/1999 | Cox et al. ..................... 380/54 |
| 6,037,984 | A | * | 3/2000 | Isnardi et al. ........... 375/240.21 |
| 6,111,990 | A | * | 8/2000 | Sugaya et al. ............... 382/250 |
| 6,216,228 | B1 | * | 4/2001 | Chapman et al. ........... 713/176 |
| 6,229,924 | B1 | * | 5/2001 | Rhoads et al. .............. 382/232 |
| 6,359,998 | B1 | * | 3/2002 | Cooklev ...................... 382/100 |
| 6,373,960 | B1 | * | 4/2002 | Conover et al. ............. 382/100 |
| 6,442,285 | B2 | * | 8/2002 | Rhoads et al. .............. 382/100 |
| 6,452,640 | B1 | * | 9/2002 | Yuen et al. .................. 348/460 |
| 6,490,681 | B1 | * | 12/2002 | Kobayashi et al. ......... 713/171 |
| 6,522,769 | B1 | * | 2/2003 | Rhoads et al. .............. 382/100 |
| 6,571,144 | B1 | * | 5/2003 | Moses et al. .................. 700/94 |
| 6,574,349 | B1 | * | 6/2003 | Linnartz et al. ............. 382/100 |
| 6,614,914 | B1 | * | 9/2003 | Rhoads et al. .............. 382/100 |
| 6,642,966 | B1 | * | 11/2003 | Limaye ....................... 348/473 |
| 6,737,957 | B1 | * | 5/2004 | Petrovic et al. ............ 340/5.86 |
| 6,785,399 | B2 | * | 8/2004 | Fujihara ...................... 382/100 |
| 6,829,710 | B1 | * | 12/2004 | Venkatesan et al. ........ 713/176 |

(Continued)

FOREIGN PATENT DOCUMENTS

EP    000651554 A1 * 10/1994

(Continued)

*Primary Examiner*—Paulos M. Natnael
(74) *Attorney, Agent, or Firm*—Larry Liberchuk

(57) ABSTRACT

Disclosed are a method, a controlling device (110), a controllable device (130) and an arrangement (100) for communicating a command from the controlling device (110) to the controllable device (130). A watermark is generated comprising the command, and embedded in a signal (120) representing an audio or video fragment. The controllable device (130) receives the signal (120) comprising the command, and decodes and executes the command therefrom. Also disclosed is a method of presenting an advertisement which involves sending a command related to presenting the advertisement using the above-mentioned method.

21 Claims, 4 Drawing Sheets

U.S. PATENT DOCUMENTS

Figure 1:
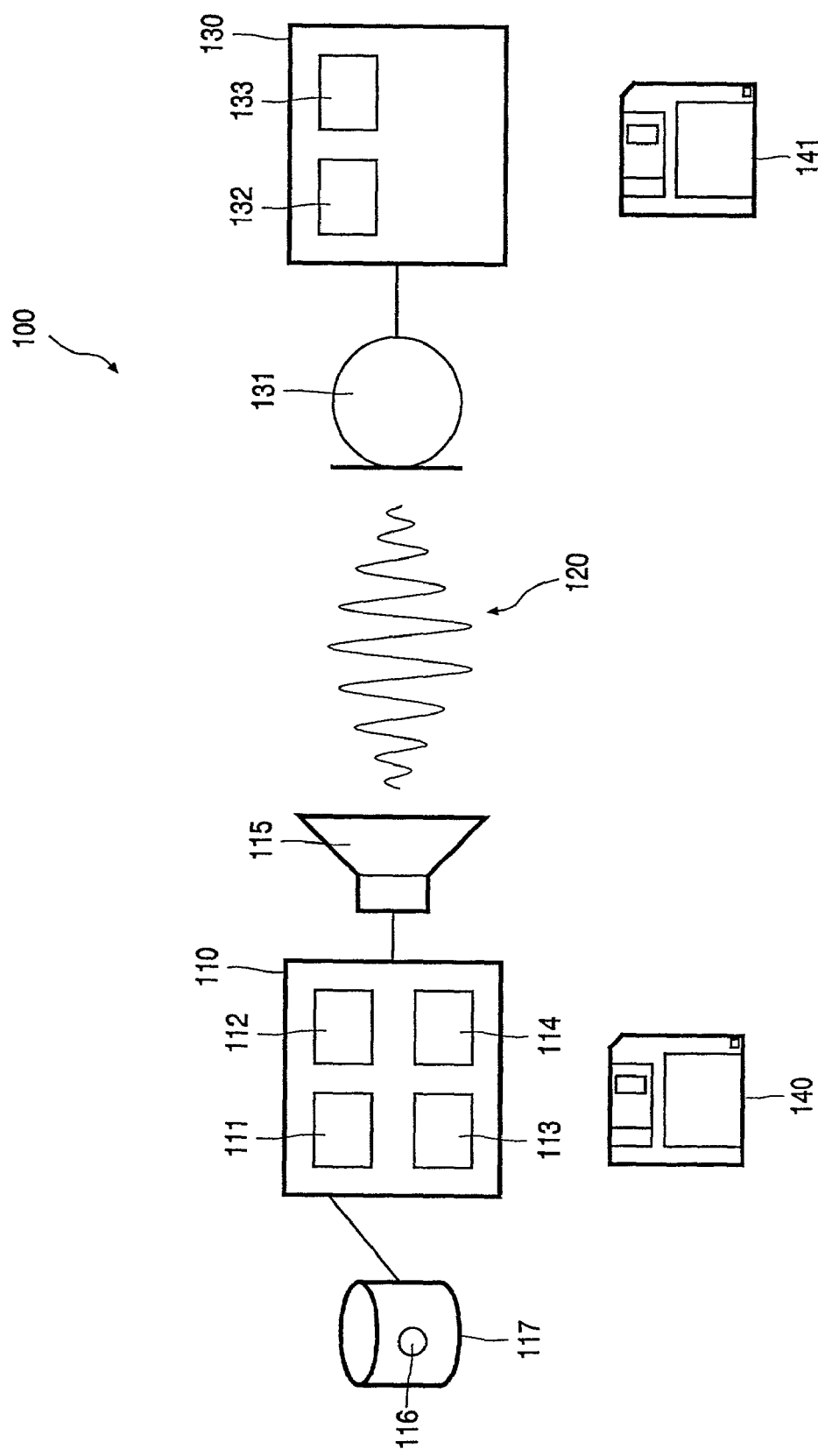

2001/0054150 A1* 12/2001 Levy .......................... 713/176
2005/0135614 A1* 6/2005 Hollar et al. ............... 380/201

FOREIGN PATENT DOCUMENTS

| | | | |
|---|---|---|---|
| EP | 1118971 A1 | | 7/2001 |
| GB | 2345779 A | | 7/2000 |
| JP | A 919394 | * | 9/1997 |
| WO | WO8707522 | | 12/1987 |
| WO | WO0015316 | | 3/2000 |

\* cited by examiner

METHOD AND DEVICE COMMUNICATING A COMMAND

The invention relates to a method of communicating a command to a controllable device.

The invention further relates to an arrangement for remotely controlling a controllable device.

The invention further relates to a controlling device arranged for communicating a command to a controllable device.

The invention further relates to a controllable device arranged for receiving a command from a controlling device.

The invention further relates to a computer program product.

The invention further relates to a method of presenting an advertisement to a user.

The invention further relates to a signal.

A method according to the preamble is known from U.S. Pat. No. 4,807,031. According to this method, commands are broadcasted in-band using video signals to an interactive device by subliminally modulating a selected sequence of video image fields. The resulting modulated video fields within the viewing area of a television, each having alternately, proportionally raised and lowered luminance horizontal scan lines, are monitored by a light sensitive device positioned adjacent to the user's television screen. The device discriminates the control data from the television program and generates an IR carrier with the control data. The IR carrier is emitted to the interactive device, which decodes the control data and selectively executes predetermined actions in response to the decoded control data.

A disadvantage of this method is that although the modulations in the video fields are substantially invisible to the user, the light sensitive device must be positioned so that it can detect the modulated fields. This typically means that an input device such as a sensor must be positioned over the relevant position(s) of the screen, which obscures that position for the user. Further, a separate device is necessary that converts the modulated fields to a command signal, which is sent by IR to the interactive device. This makes the method costly and cumbersome to install. A further disadvantage is that the method is only usable with video signals.

It is an object of the invention to provide a method of communicating according to the preamble, which provides a way to directly send commands to a controllable device.

This object is achieved according to the invention in a method which comprises the steps of
generating a watermark comprising the command, which is to be executed by the controllable device,
generating a watermarked signal comprising the watermark and an information unit to be transmitted to the controllable device, and
transmitting the watermarked signal to the controllable device for causing the controllable device to execute the command.

According to the invention, the command is communicated to the controllable device by embedding it in the transmitted signal by means of a watermark. The information unit thus serves as a carrier for the command, and there no longer is a need for a control channel that transmits the command to the controllable device. The controllable device may pick up the watermarked signal using a microphone or similar device, and decode and execute the embedded commands. The method is applicable in any situation and environment, for instance in a public location where a loudspeaker produces audio signals, or at an exhibition where an object is shown on a screen using a signal that comprises the command. The information unit can be transmitted by broadcasting it, or by storing it on a carrier such as a videotape or compact disc, which is played back where the controllable device can receive the watermarked signal. In practice, the effect of using the method is that the mere rendering of the watermarked signal results in the controllable device executing some action, as the communication of the command is invisible due to the watermarking used. Since audio signals are very permeating, they are very suitable as a carrier for the commands. Using this method, the controllable device can be remotely controlled by a controlling device.

It is known to use watermarks to embed extra information for an information unit. This extra information may be, for instance, an Uniform Resource Locator (URL) for a World-Wide Web resource containing more information associated with the information unit, as is described in U.S. Pat. No. 5,841,978. Upon receiving the information unit with the embedded extra information, the controllable device can decode the URL and fetch the associated resource for displaying it to the user. This approach, however, is limited to embedding specific types of extra information for presenting it to a user and is not extensible. In contrast, the present invention uses watermarks to embed commands in the information unit, which are used to control the controllable device remotely.

In an embodiment the watermarked signal is generated in a first domain by outputting a watermark signal representing the watermark to the first domain for merging the watermark signal with an information signal representing the information unit in the first domain. Preferably the first domain is one of the acoustic domain and the visual domain. The information unit is typically in a different second domain, such as the electrical domain. An advantage of this embodiment is that now the original input signal itself is watermarked, and no unwatermarked specimens exist. For instance, consider the exhibition of a painting. A watermark is generated for the painting, and instead of outputting a copy of the painting with the watermark embedded, a visual watermark is projected on the actual painting hanging on the wall. Now all photographs etc. made of the painting will have the watermark embedded. Further, by transmitting the watermarked signal in the acoustical or visual domain, no physical communication channel such as a cable needs to be established for the commands to reach the controllable device. This makes the method very suitable for remote control of any kind of device. For example, the controllable device can be realized as a mobile phone, which its owner merely has to aim towards a source of the signal to receive it. Since the command is embedded in an audio or video signal that is transmitted by a device such as a television or loudspeaker, the signal comprising the command will reach the controllable device directly.

In a further embodiment the command relates to at least one of: control of a physical movement of a part of the controllable device, rendering of an audio output by the controllable device, rendering of a visual output by the controllable device, and adjusting a value for at least one parameter associated with the command. A central computer can, using this method, give spoken commands to other appliances which need to be controlled. This way the user can immediately hear which commands are given and see how the appliances react, which is preferable over having invisible commands sent and suddenly seeing appliances act differently. However, instead of the voice command itself being interpreted by the appliance, it is the command embedded in the signal that contains the actual command. In this way, the voice commands are freely programmable for e.g. local languages or user preferences, without having to reprogram any of the appliances. One user may prefer polite and formal commands, while another may want short and clear commands. Both users can, using the method according to the invention, program their own commands however they want, yet the actual command set does not need to be modified, nor do the appliances need to be reprogrammed to recognize the user's commands. The commands can be embedded as short identifiers, for example numbers, that are defined in the same way in the central computer and in the appliances.

It is a further object of the invention to provide an arrangement according to the preamble, which provides a way to directly send commands to a controllable device.

This object is achieved according to the invention in an arrangement comprising embedding means for generating a watermark comprising the command, which is to be executed by the controllable device, watermarking means generating a watermarked signal comprising the watermark and an information unit to be transmitted to the controllable device, output means for transmitting the watermarked signal to the controllable device for causing the controllable device to execute the command, receiving means for receiving the signal in the controllable device, decoding means for obtaining the information unit from the signal and obtaining the command from the information unit, and executing means for executing the command.

It is a further object of the invention to provide a controlling device according to the preamble, which is arranged to directly send commands to a controllable device.

This object is achieved according to the invention in a controlling device comprising embedding means for generating a watermark comprising the command, which is to be executed by the controllable device, watermarking means generating a watermarked signal comprising the watermark and an information unit to be transmitted to the controllable device, output means for transmitting the watermarked signal to the controllable device for causing the controllable device to execute the command.

It is a further object of the invention to provide a controllable device according to the preamble, which is arranged to directly receive a command in a first domain from a controlling device.

This object is achieved according to the invention in a controllable device comprising receiving means for receiving the signal in the controllable device, decoding means for obtaining the information unit from the signal and obtaining the command from the information unit, and executing means for executing the command.

The invention further relates to a computer program product being arranged for causing a processor to execute the method of communicating according to the invention.

It is a further object of the invention to provide a method of presenting an advertisement according to the preamble, which provides a way to directly send a command related to the advertisement to a controllable device.

This object is achieved in a method comprising the steps of generating a watermark comprising the command, which is to be executed by the controllable device, the command being related to presenting an advertisement, generating a watermarked signal comprising the watermark and an information unit to be transmitted to the controllable device, and transmitting the watermarked signal to the controllable device for causing the controllable device to execute the command by generating the advertisement and presenting the advertisement to the user. Using this method, consumers can be directly reached with advertising messages. The controllable devices will typically be realized as a teddy bear or other toy, and if the advertisement comes from this toy, the owner is more likely to respond to it positively.

In an embodiment the method further comprises the steps of maintaining a user profile for the user based on a sale of a controllable device to the user, determining using the user profile a product that the user is likely to want to buy, and adding an identifier for the product to the command. An advantage of this embodiment is that the user profile can be used to target the advertisement for the product, so the advertisement that is presented is more tailored to the user. This type of personalized message will greatly stimulate sales of the advertised product, since it appears to originate from the controllable device and is aimed directly at its owner, and not from some unpersonal public announcement.

Figure 2:
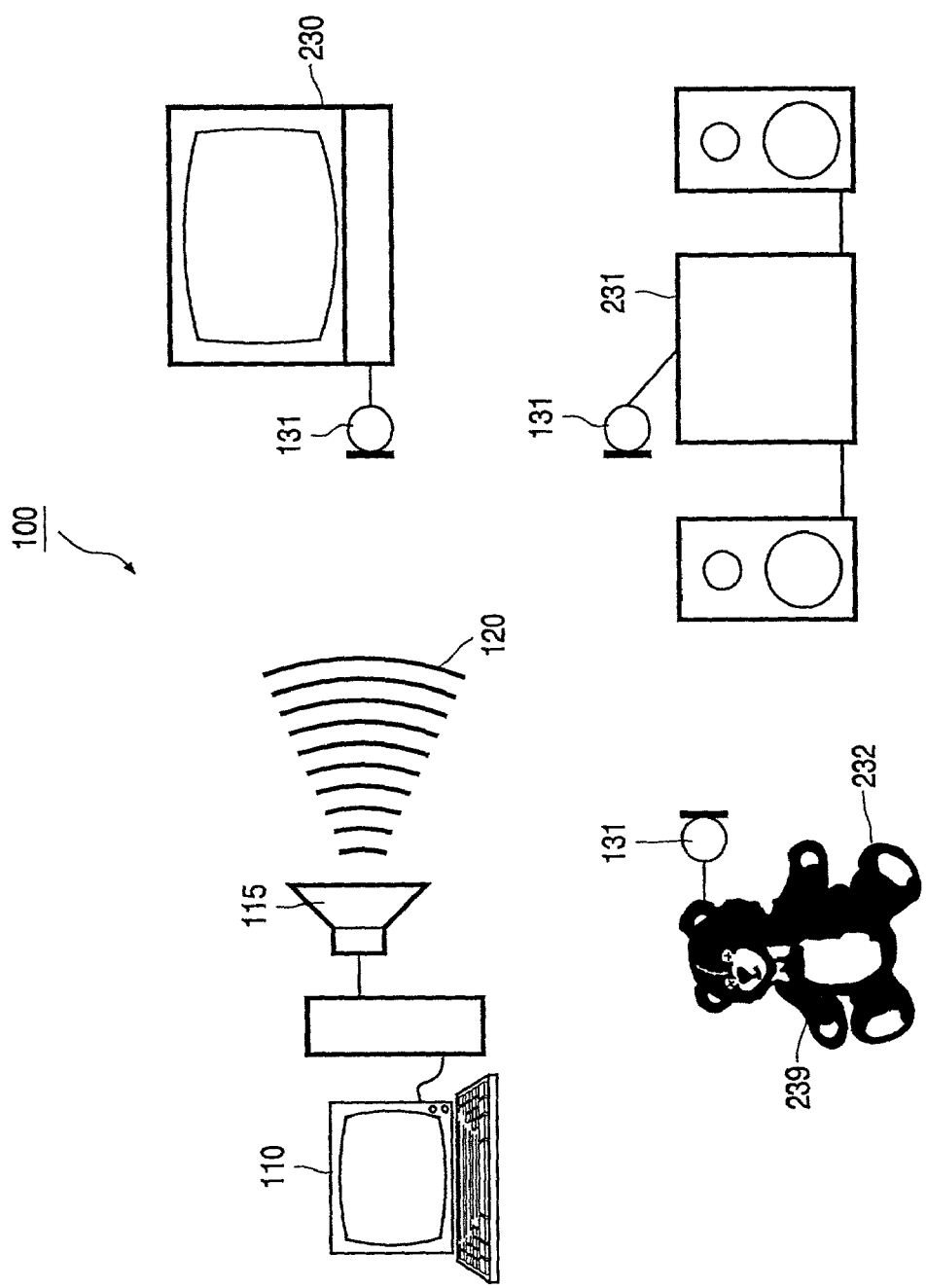
Figure 3:
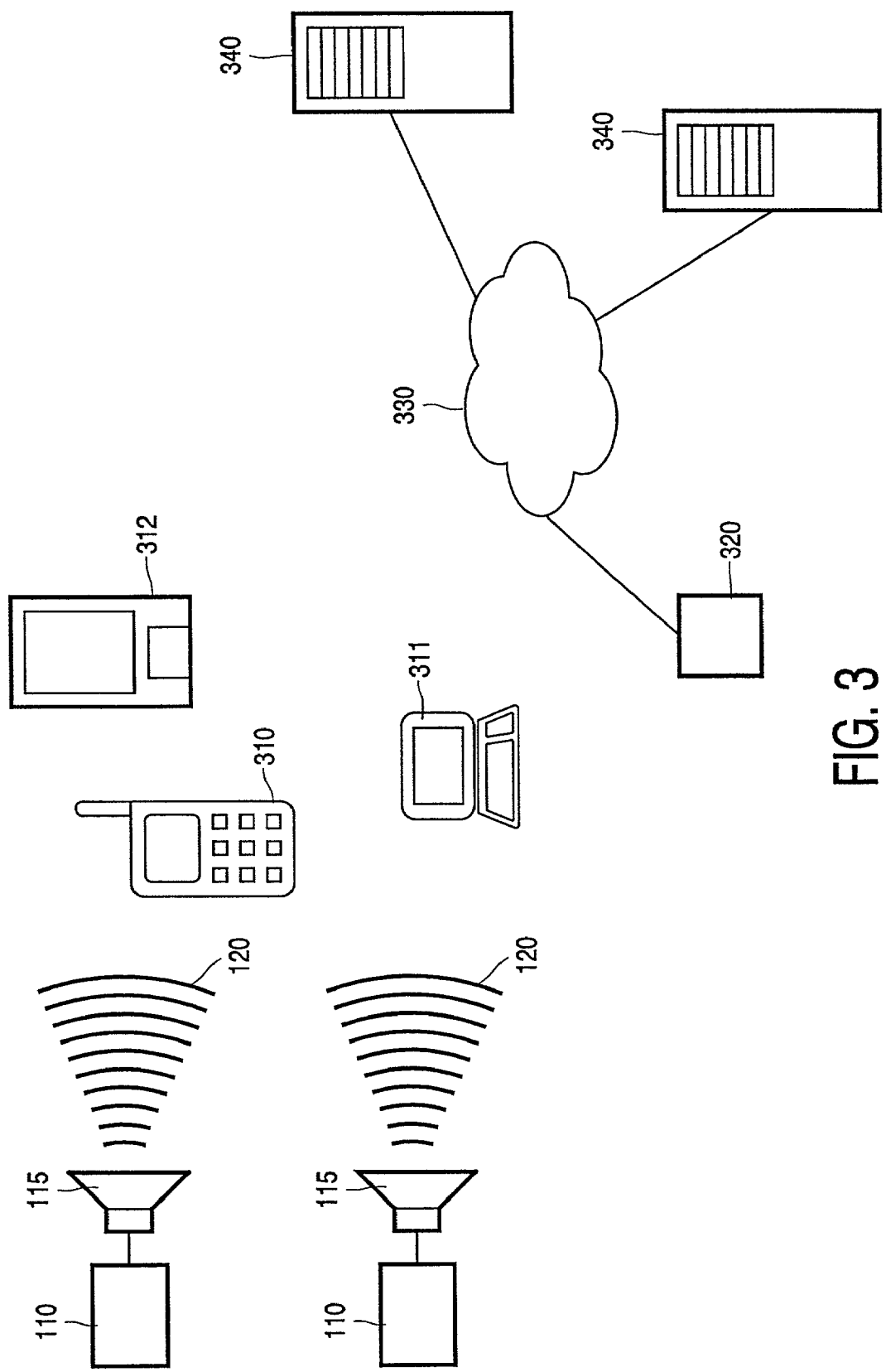
Figure 4:
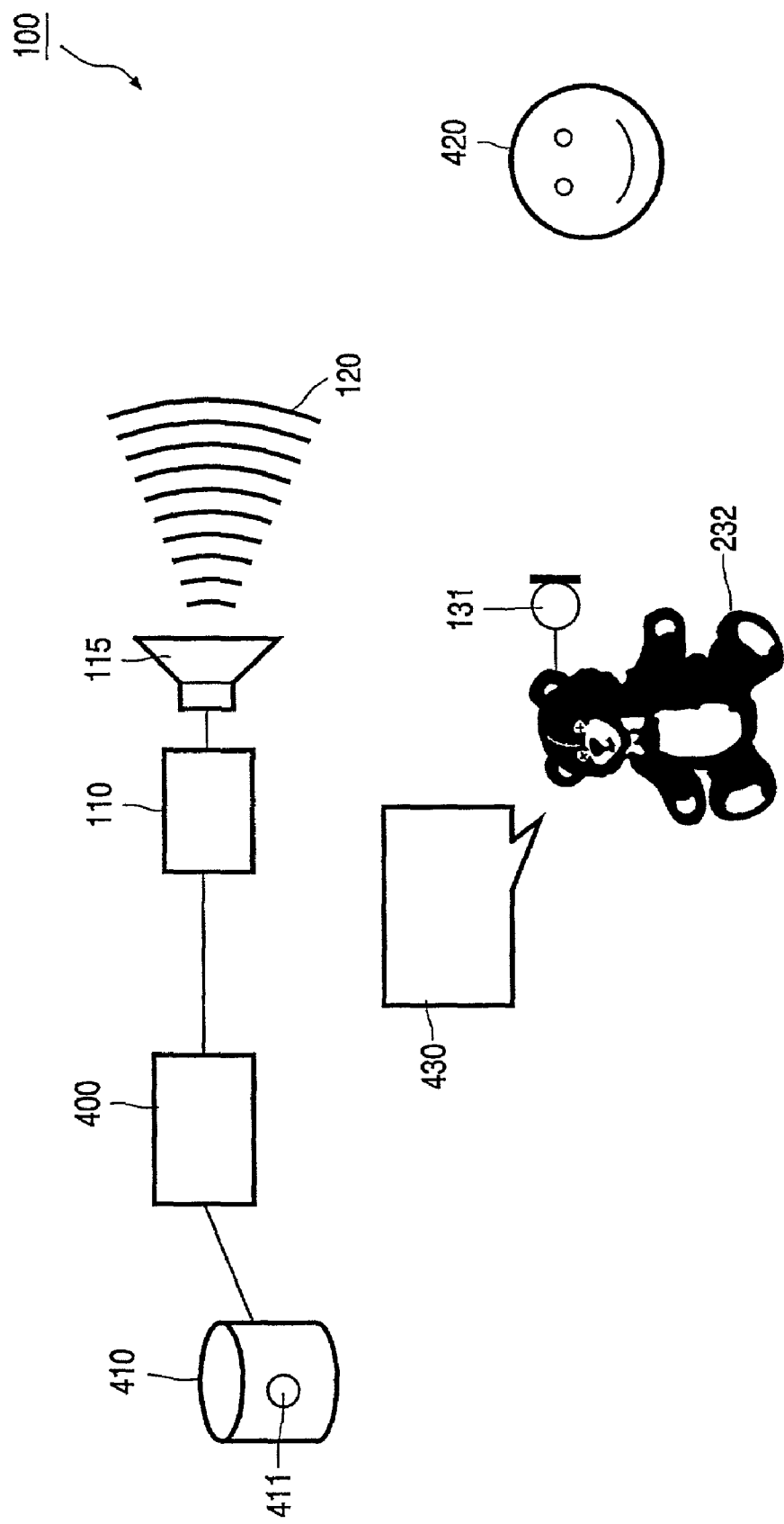

These and other aspects of the invention will be apparent from and elucidated with reference to the embodiments shown in the drawing, in which:

FIG. 1 schematically shows a first arrangement comprising a controlling device and a controllable device according to the invention;

FIG. 2 schematically shows a second embodiment of the arrangement;

FIG. 3 schematically shows another embodiment of the controlling device and the controllable device; and FIG. 4 shows an alternative embodiment of the arrangement according to the invention.

Throughout the figures, same reference numerals indicate similar or corresponding features. Some of the features indicated in the drawings are typically implemented in software, and as such represent software entities, such as software modules or objects.

FIG. 1 schematically shows a first arrangement 100 comprising a controlling device 110 and a controllable device 130. The controlling device 110 comprises determining module 111, loading module 112, embedding module 113, watermarking module 114 and output module 115. The controlling device 110 is, in accordance with the invention, arranged to communicate one or more commands to the controllable device 130, which should execute these commands. The determining module 111 determines these commands. The commands are preferably related to an information unit 116 which is to be transmitted to the controllable device 130. The information unit 116 is for instance a television program, a radio program, a movie, an advertisement, a picture or a sound or a portion thereof.

The commands are preferably in some way related to portions of the information unit 116. For example, a command to show a particular piece of background information on an object should preferably be given when the object is rendered during playout. The controllable device 130 will then show the background information at the appropriate moment. As an other example, a command to play back a recording of a song should preferably be given when the same song is sung in the information unit 116, so the controllable device 130 appears to "sing along" with the information unit 116. However, the commands need not be related to the information unit 116. This is often the case when the information unit 116 is to be transmitted using a broadcast where other devices are also able to receive it. This is discussed in more detail with reference to FIG. 2 below.

The command may comprise values for one or more parameters that affect the execution of the command. For instance, the command may relate to only one particular controllable device, while multiple controllable devices may be able to receive the command. In that case, the command should comprise a parameter identifying the one particular controllable device. The controllable device 130 may also adjust a value for at least one parameter in its configuration, based on a value given in the command. For instance, the command may relate to a sound volume and comprise a numerical value for the volume. The controllable device 130 should then adjust its sound volume to the value given in the command.

The loading module 112 loads the information unit 116. The information unit 116 may be one channel of a broadcast transmission comprising multiple channels, or it may be an item stored on a storage unit 117. This storage can be a tape or a disk such as a DVD or Video CD. It can also be received from an external source, such as the Internet, a satellite feed or home network. The information unit 116 may be selected by a user using a remote control or other input device, but the selection may also be made by the controlling device 110 itself.

The embedding module 113 generates a watermark comprising the command, which is to be executed by the controllable device 130. This watermark is to be communicated to the controllable device 130 together with the information unit 116, so preferably the watermark is generated based on the information unit 116 or its representation. Commands may need to be embedded in a synchronized fashion with the activity in the information unit 116, so that their executions will be synchronized with this activity as well. In other situations, the commands need to be executed at particular points in time, for example when the commands are intended to activate or deactivate the controllable device 130 according to some predetermined schedule. In those situations, the expected rendering times of the information unit 116 should be known so that the commands can be embedded at the corresponding locations in the representation.

Embedding the command can be done using any kind of watermarking or other steganographic technique appropriate for the information unit 116. The watermark comprising the command can be embedded in a representation of the information unit 116 which is in a second domain, such as the electrical domain. The representation with the command embedded in it is then sent to the watermarking module 114, which generates a watermarked signal 120 that can be communicated in the first domain, such as the acoustical or visual domain, to the controllable device 130. Alternatively the command can be embedded by generating an information signal representing the information unit 116 and a watermark signal for the watermark comprising the command, and outputting both signals to the first domain where they can merge to form the watermarked signal 120. This may require two watermarking modules 114 and/or two output modules 115, one for each signal, in the controlling device 110. The command is then embedded in the watermarked signal 120 in the first domain due to the merging.

In any case, the watermarking module 114 generates a watermarked signal 120 comprising the watermark and the information unit 116. The output module 115 then transmits the watermarked signal 120 to the controllable device 130 for causing the controllable device 130 to execute the command. While presented here as a real-time operation, it is in fact not necessary for the controlling device 110 to embed the command in the signal and to output the watermarked signal 120 at once. The controlling device 110 may also store the watermarked signal 120 on a storage medium such as storage unit 117 for later outputting. For example, the controlling device 110 may create watermarked videotapes this way, which tapes can be sold in stores and played back by the owner of the controllable device 130. Thus, the transmission performed by the output module 115 can be realized by outputting towards a storage medium from which the watermarked signal 120 can be read for transmission in the first domain to the controllable device 130.

The controllable device 130 comprises receiving module 131, decoding module 132 and executing module 133. The receiving module 131 receives the signal 120 in the first domain, and feeds it to the decoding module 132. The receiving module 131 can be for instance a microphone, a camera or a light sensitive sensor of some kind.

The decoding module 132 obtains the information unit 116 from the signal 120. Typically receiving and decoding comprises converting the signal 120 into a representation in the electrical domain. The decoding module 132 then processes the information unit 116 to obtain the command.

The command is then fed to the executing module 133 which executes the command. The command may relate to control of a physical movement of a part of the controllable device 130, rendering of an audio output by the controllable device 130, rendering of a visual output by the controllable device 130, adjusting a value for at least one parameter associated with the command, or other actions which the controllable device 130 should perform. Some examples of possible commands are given below with reference to FIG. 2.

The commands can be embedded as short identifiers, for example numbers, that are defined in the same way in the central computer and in the appliances. This makes the information that needs to be embedded very short, and it still allows potentially long and complex commands to be embedded. The controllable device 130 merely needs to look up the corresponding command for the identifier that is embedded in the signal 120. A single command may trigger a sequence of predetermined actions. For example, the single command "start to dance" may trigger movements of the legs, head and arms of a doll that is suitable equipped.

The controlling device 110 can be realized as a computer program product 140 being arranged for causing a processor to execute the method of controlling according to the invention. The computer program product 140 enables a programmable device when executing said computer program product to function as the controlling device 110. Similarly, the controllable device 130 can be realized as a computer program product 141 enabling a programmable device when executing said computer program product to function as the controllable device 130.

FIG. 2 schematically shows a second embodiment of the arrangement 100. In this embodiment, the controlling device 110 is arranged to output the signal 120 by broadcasting it. For example, in the case of an audio signal 120, the signal 120 can be output by a loudspeaker so that all controllable devices can pick it up using a microphone. The controllable devices can be realized as a multimedia station such as television receiver 230 or personal stereo 231. It can also be realized as a toy such as teddy bear 232. Other embodiments are of course also possible. The controllable devices 230, 231, 232 have respective receiving units 131, in the case of audio signals preferably a microphone, which in this embodiment are arranged to pick up the broadcast signal 120.

It may happen that a particular command is only intended for one particular controllable device. The other controllable devices should not execute this command, as this may lead to unwanted situations. To ensure that only the intended controllable device executes the command, the controlling device 110 should preferably add an identifier for the intended particular controllable device to the command before embedding it in the representation of the information unit 116. For example, the information unit 116 may be background music played on a loudspeaker and the command therein may be intended for one controllable device 130 that is in range of the loudspeaker. Note that in this case, although the information unit 116 is transmitted via broadcast to the controllable device 130, it is not related to the information unit 116.

The command to be executed on the controllable device may relate to control of a physical movement of a part of the controllable device. For instance, the controlling device 110 may send the teddy bear 232 a command to move its arm 239. If the commands embedded in the representation of the information unit 116 are coordinated with activity in the information unit 116, then the physical movements executed by the controllable device will be seen as responsive to the information unit 116. This applies to moving one or more parts of the controllable device, but also to audible or visual output by the controllable device or other actions it can take in response to receiving the commands.

As an example, the executing means 133 in the teddy bear 232 can be arranged to move the arm 239 or other limbs of the bear 232, but also to play a song or output some sentence or word in response to receiving the appropriate command from the controlling device 110. If the information unit 116 is a television program, then the commands can be embedded at locations where the corresponding actions occur in the television program. The effect will be that the teddy bear 232 will sing along with the singing characters of the television program, move his limbs when the characters of the television program do so as well, and so on. To an observer, it will seem as if the teddy bear 232 really reacts to the television program itself.

It is possible to realize the controlling device 110 and the controlled device 130 in one physical device, such as the teddy bear 232. The bear 232 will then comprise both an output module 115 and a receiving module 131, as well as the determining module 111, loading module 112, embedding module 113, watermarking module 114, decoding module 132 and executing module 133. Two teddy bears realized in this fashion can now exchange commands and respond to each other's commands. To an observer, it will seem as if they are really interacting with each other. For instance, one teddy bear may start singing a song, realized by starting the playback of a prerecorded music unit, and the other teddy bear will sing along, because the music unit being output has a command embedded that causes the other teddy bear to start singing as well. Preferably the command includes a parameter that indicates at what point in the music unit the other teddy bear should start playing back, so that both bears will sing in tune.

FIG. 3 schematically shows another embodiment of the controlling device 110 and the controllable device 130. The controllable device 130 can be realized as a mobile phone 310, a handheld computer 311 or a personal digital assistant 312, or any other kind of mobile device. The controlling devices 110 are in this embodiment arranged for transmitting the information unit 116 to the controllable devices 320, 311, 312, with a command to record or log statistics or information related to the information unit 116 embedded in it. An advantage of realizing the controllable device 130 as a mobile phone 310, handheld computer 311 or PDA 312 is that they usually already have a receiving module 131, such as a microphone, and so need no external modifications. If the decoding module 132 and the executing module 133 can be realized as software modules, no hardware adjustments are necessary at all, thereby saving costs in manufacturing these controllable devices 130. To have the commands executed by the executing module 133, the owner of the controllable device 130 merely needs to aim the device 130 at a source of the signal 120, for example by holding it up to a loudspeaker. Of course the microphone may be sensitive enough to pick up the signal 120 without needing to be aimed at a source explicitly.

The controllable devices 310, 311, 312 in this embodiment are arranged to receive the signal comprising the information unit 116, to obtain the command embedded therein and to execute the command, as explained with reference to FIG. 1. In the embodiment of FIG. 3, the commands relate to the logging of the received information units. For instance, the command may simply be "record in logfile" with a parameter value identifying the received information unit. It may also instruct the controllable device to present a questionnaire to the user, for instance to measure his preference for the received information unit. The input of the user is then logged together with the identification for the received information unit. Additionally, the command may instruct the controllable device to show a "buy button", which the user can activate to buy the information unit directly.

The controllable devices 310, 311, 312 can be connected via a connector 320 to a network 330 such as the Internet. The connector 320 can be for instance a transfer device or docking station for the controllable devices 310, 311, 312, or a base station that can relay a communication session over the network 320. Also connected to the network 330 is a plurality of servers 340. Using the network connection, the controllable devices 310, 311, 312 can communicate the information recorded in their logfile to the servers 340. Using this information, the servers 340 can generate or maintain a user profile for the owner of the controllable devices 310, 311, 312. The plurality of servers 340 can also comprise e-commerce servers which receive the logfile, or other data, from the controllable devices 310, 311, 312 and perform some action based on them.

The arrangement 100 and the various embodiments of the controlling device 110 and the controllable device 130 as described above can advantageously be used to enhance television and radio programs, interactive movies and advertisements. The controllable device 130 can be arranged to attract attention to the television unit when it receives a particular command, for example by playing back a prerecorded sound unit that contains an audio message to this effect. If the television unit then shows a commercial in which this particular command is embedded, the controllable device 130 will attract attention to that commercial. This increases exposure to the commercial.

The same principle can be used in other situations as well. Two controllable devices 130 can be arranged to respond to each other if they are within a certain range, for example by embedding a command with a unique identifier for themselves in all their audio outputs. This command should induce other controllable devices 130 to respond with a greeting of some kind, or to start a joint activity such as singing a song. This command can also be embedded in background music in a toy store, so its owner can take his teddy bear 232 to the store and have it interact with other teddy bears 232 on sale there.

FIG. 4 shows an alternative embodiment of the arrangement 100. If the controllable device, in this embodiment the teddy bear 232, is personalized and has an identifier which is related to its owner 420, then this identifier can be used for distributing targeted advertisements. A merchant 400 can keep track of data regarding sales of the teddy bears 232 using database 410, and can correlate this data with other marketing data to obtain a user profile 411 for the customers which bought the teddy bear 232. Based on the user profile 411, the merchant 400 can generate targeted advertisements.

The merchant 400 then uses his controlling device 110 to embed a command related to advertising in some information unit 116 that the owner of a particular controllable device 130 is likely to receive. The command should comprise parameter values that are specific for the targeted advertisement, such as the identifier for the teddy bear 232 and an identifier and price for the product or service being advertised. When the command is then embedded in the information unit 116, the unit 116 is sent to the teddy bear 232 as signal 120. The teddy bear 232 receives the signal 120 using its microphone 131 and decodes the command embedded therein. It then executes the command so the targeted advertisement 430 is presented its owner 420. There are various ways to generate and present the targeted advertisement 430. Several ways are described below.

Assume that a new model or accessory is available. Based on the user profile 411 for the owner 420, the merchant 400 determines that this owner 420 is likely to want to buy this new model or accessory. The merchant 400 now selects the command "present advertisement" and adjusts the appropriate parameter values for the advertisement, such as the identifier for the new product and its price, the identifier for the user, and possibly other parameter values as well.

Next, the merchant 400 determines an information unit 116 which the owner 420 is likely to want to receive. This can be a television program featuring the teddy bear 232, a CD or DVD with music related to a show featuring the teddy bear 232, and so on. Alternatively, background music in a shopping mall in which the merchant's store is located could be determined as the information unit 116. This background music is presented to shoppers over a public loudspeaker system. The merchant 400 now embeds the command "present advertisement" with the appropriate parameter values in the background music.

When the targeted teddy bear 232 receives the background music signal, it decodes the command and executes it by generating and presenting the advertisement 430 to its owner. A preferred embodiment of this advertisement 430 is an audio message promoting the product indicated in the command. The teddy bear 232 then executes the command by saying for "Hey, I've got a new friend! He's on sale now for only $29.95! Let's run to the store!" to its owner. This type of personalized message will greatly stimulate sales of the advertised product, since appears to originate from the teddy bear 232 and is aimed directly as its owner, and not from some unpersonal public announcement.

Alternatively, if the controllable device 130 has a display, the advertisement can be shown on the display, The controllable device 130 may be arranged to download video or audio units and to present them to a user. This mechanism can be used to download and present advertisments in response to a command.

The invention claimed is:

1. A method of communicating a command to a controllable device, comprising the steps of:
   generating a watermark comprising the command, which is to be executed by the controllable device;
   generating a watermarked signal comprising the watermark and an information unit to be transmitted to the controllable device; and
   transmitting the watermarked signal to the controllable device for causing the controllable device to execute the command, wherein transmitting the watermarked signal comprises rendering the watermarked signal using at least one of a video device and an audio device, the controllable device capable of receiving the rendered watermarked signal produced by at least one of the video device and the audio device.

2. A method as claimed in claim 1, wherein the watermarked signal is generated in a first domain and the information unit is generated in a second domain.

3. A method as claimed in claim 2, wherein the first domain is one of an acoustic domain and a visual domain.

4. A method as claimed in claim 2, wherein the second domain is an electrical domain.

5. A method as claimed in claim 1, where the command relates to at least one of: control of a physical movement of a part of the controllable device, rendering of an audio output by the controllable device, rendering of a visual output by the controllable device, and adjusting a value for at least one parameter associated with the command.

6. A computer program product being arranged for causing a processor to execute the method of claim 1.

7. An arrangement for remotely controlling a controllable device, comprising:
   embedding means for generating a watermark comprising a command, which is to be executed by the controllable device;
   watermarking means for generating a watermarked signal comprising the watermark and an information unit to be transmitted to the controllable device;
   output means for transmitting the watermarked signal to the controllable device for causing the controllable device to execute the command, the output means comprising at least one of video means and audio means capable of transmitting the watermarked signal by rendering the watermarked signal;
   receiving means for receiving the rendered watermarked signal in the controllable device, the receiving means capable of receiving the rendered watermarked signal produced by at least one of the video means and the audio means;
   decoding means for obtaining the information unit from the rendered watermarked signal and obtaining the command from the information unit; and
   executing means for executing the command.

8. A controlling device arranged for communicating a command to a controllable device, comprising:
   embedding means for generating a watermark comprising the command, which is to be executed by the controllable device;
   watermarking means for generating a watermarked signal comprising the watermark and an information unit to be transmitted to the controllable device; and
   output means for transmitting the watermarked signal to the controllable device for causing the controllable device to execute the command, the output means comprising at least one of video means and audio means capable of transmitting the watermarked signal by rendering the watermarked signal, the controllable device capable of receiving the rendered watermarked signal produced by at least one of the video means and the audio means.

9. A controllable device arranged for receiving a command from a controlling device, comprising:
   receiving means for receiving a rendered watermarked signal in the controllable device, the rendered watermarked signal produced by at least one of video means and audio means in the controlling device, at least one of the video means and the audio means capable of rendering a watermarked signal;

decoding means for obtaining an information unit from the rendered watermarked signal and obtaining the command from a watermark in the information unit; and executing means for executing the command.

10. A method of presenting an advertisement to a user, comprising the steps of:

generating a watermark comprising a command, which is to be executed by a controllable device, the command being related to presenting the advertisement;

generating a watermarked signal comprising the watermark and an information unit to be transmitted to the controllable device; and transmitting the watermarked signal to the controllable device for causing the controllable device to execute the command by generating the advertisement and presenting the advertisement to the user, wherein transmitting the watermarked signal comprises rendering the watermarked signal using at least one of a video device and an audio device, the controllable device capable of receiving the rendered watermarked signal produced by at least one of the video device and the audio device.

11. A method as claimed in claim 10, further comprising the steps of:

maintaining a user profile for the user based on a sale of the controllable device to the user;

determining using the user profile a product that the user is likely to want to buy, and adding an identifier for the product to the command.

12. An apparatus for remotely controlling a controllable device, comprising:

an embedding module for generating a watermark comprising a command to be executed by the controllable device;

a watermarking module for generating a watermarked signal comprising the watermark and an information unit to be transmitted to the controllable device; and an output module for transmitting the watermarked signal to the controllable device for causing the controllable device to execute the command, the output module comprising at least one of a video device and an audio device capable of rendering the watermarked signal, the controllable device capable of receiving the rendered watermarked signal produced by at least one of the video device and the audio device.

13. The apparatus of claim 12, wherein the watermarked signal is generated in a first domain and the information unit is generated in a second domain.

14. The apparatus of claim 13, wherein the first domain comprises one of a visual domain and an acoustic domain, and the second domain comprises an electrical domain.

15. The apparatus of claim 13, wherein:

the video device comprises a television and the audio device comprises a loudspeaker; and the information unit comprises at least a portion of one of: a television program, a radio program, a movie, an advertisement, a picture, and a sound.

16. The apparatus of claim 12, wherein:

the video device comprises a television; and the audio device comprises a speaker.

17. An apparatus for receiving a command from a controlling device, comprising:

a receiving module for receiving a rendered watermarked signal comprising a watermark from the controlling device, the rendered watermarked signal produced by at least one of a video device and an audio device in the controlling device, at least one of the video device and the audio device capable of rendering a watermarked signal;

a decoding module for obtaining an information unit from the rendered watermarked signal and obtaining a command from the information unit; and an executing module for executing the command.

18. The apparatus of claim 17, wherein the watermarked signal is generated in a first domain and the information unit is generated in a second domain.

19. The apparatus of claim 18, wherein the first domain comprises one of a visual domain and an acoustic domain, and the second domain comprises an electrical domain.

20. The apparatus of claim 17, wherein:

the modules form a portion of one of: a mobile telephone, a television receiver, a stereo, a toy, a handheld computer, and a personal digital assistant; and the information unit comprises at least a portion of one of: a television program, a radio program, a movie, an advertisement, a picture, and a sound.

21. The apparatus of claim 17, wherein:

the video device comprises a television;

the audio device comprises a speaker; and the receiving module comprises at least one of: a microphone, a camera, and a light sensitive sensor.

* * * * *